Dec. 5, 1950   R. S. NORMAN   2,532,417
PHOTOELECTRIC EXPOSURE METER
Filed Oct. 5, 1948   2 Sheets-Sheet 1

Robert S. Norman
INVENTOR.

BY Clarence A. O'Brien
and Harvey B. Jacobson
Attorneys

Dec. 5, 1950  R. S. NORMAN  2,532,417
PHOTOELECTRIC EXPOSURE METER
Filed Oct. 5, 1948  2 Sheets-Sheet 2

Robert S. Norman
INVENTOR.

BY *Clarence A. O'Brien*
*and Harvey B. Jacobson*
Attorneys

Patented Dec. 5, 1950

2,532,417

UNITED STATES PATENT OFFICE 2,532,417

PHOTOELECTRIC EXPOSURE METER

Robert S. Norman, Killeen, Tex.

Application October 5, 1948, Serial No. 52,906

1 Claim. (Cl. 88—23)

This invention relates to exposure meters of the type using a current generating photo-electric cell operating a galvanometer provided with a pointer and a follow up pointer which has to be aligned with the galvanometer pointer.

It is the primary object of the invention to provide an exposure meter of a very compact construction, displaying its indications clearly so as to avoid errors and permitting to obtain indications taking into account the influence of a larger number of factors than that which is conventionally provided for in known instruments.

Exposure meters used for measuring the illumination prevailing at the spot at which a photographic picture has to be made usually indicate the shutter speed and the relative aperture to be used. These adjustment factors are either indicated by the galvanometer pointer itself or by some member moved manually in accordance with the pointer indication. However as exposure is also dependent on factors other than illumination, corrections or further adjustments have to be made.

As a rule, merely an adjustment for the emulsion speed is provided for in the conventional meters and correction for this factor is applied by adjusting separately one of the two scale plates.

According to the invention an adjustment for at least two additional factors, influencing the adjustment of the camera controls, may be added to the adjustment indication for the illumination. Such additional adjustments usually entail a complex manipulation and a still more complex method of reading the meter, but according to the invention the meter is so arranged that the manipulation and the reading method remain practically unchanged. Likewise the mechanism, which in such cases is complex and intricate and entails different types of driving means to be changed by couplings, is simple and only provides positive connections.

This result is obtained by providing a special pre-adjustment of the starting position of the member which has to be moved manually in conformity with the indications of the galvanometer pointer.

It is therefore an object of the invention to provide an exposure meter with a manually movable pointer, adapted to be aligned with the galvanometer pointer the starting position of which is adjustable in accordance with one of the factors such as emulsion speed rating, influencing the exposure.

It is a further object of the invention to provide a follow up pointer with a dual driving mechanism, one of the component mechanisms of the dual pointer driving mechanism, rotating the follow up pointer around a pivot while the second component mechanism is shifting the pivot of the follow up pointer.

It is a further object of the invention to provide a pivoted follow up pointer with a dual driving mechanism, consisting of two independent single gear mechanisms, each coupled with one of the scale plates of the exposure meter, each of said gear mechanisms comprising a rack driven by gear trains, one of said racks turning said pointers around its pivot while its gear train is coupled with one of the rotating scales adjusted by hand operation preliminary to the follow up operation of the pointer, while the other rack carries the pivot of the pointer and is coupled with a gear train coupled with a hand operated knob operated to produce the follow up movement.

It is a further object of the invention to provide a stationary reference scale which is adjustable and may be moved by hand and fixed at different points in order to adjust the reading for different filter factors.

It is a further object of the invention to use the outermost scale plate of a series of concentric scales as an adjustable stationary scale member which member may be adjusted by a preliminary adjustment so as to occupy the correct position corresponding to a selected filter factor to be used, during the following alignment movement of the follow up pointer.

It is still a further object of the invention to provide dual means for moving a follow up pointer, movable around a pivot, one of said dual means preadjusting the starting position of the pointer and the other shifting the pivot of the pointer, each of said means comprising a shiftable member operated by gear wheels arranged one behind the other, the connection between the gear wheels, the pointer operating shiftable means and the scale plates being made by using a double rack and a crown wheel transmission respectively.

Further more specific objects will be apparent from the following detailed specification.

The invention is illustrated in the accompanying drawings showing one embodiment thereof. It is however to be understood that the embodiment illustrated shows the invention only by way of example, in order to be of assistance when the principle of the invention and the best mode of applying said principle is explained in the following detailed specification. The information supplied will enable the expert skilled in this art to construct modifications applying the principle of the invention in the way best suited to prevailing conditions and modifications of the example shown are therefore not necessarily departures from the essence of the invention.

Figure 1:
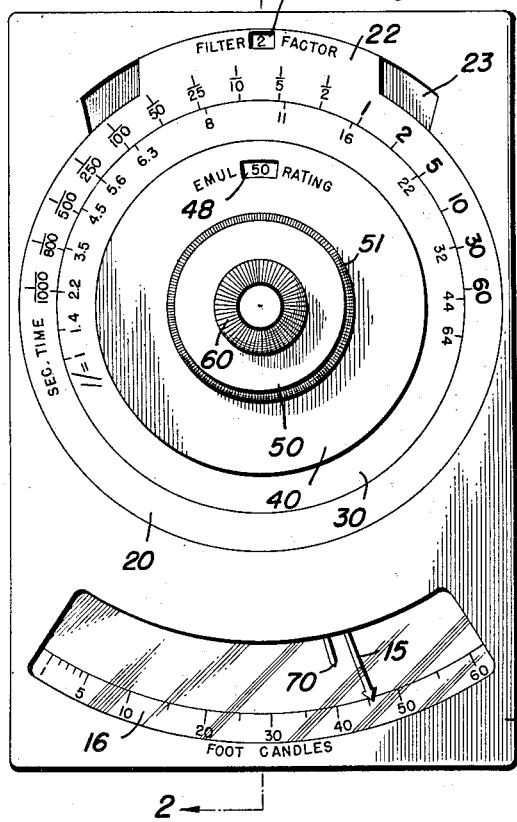
Figure 1 is a front view of an exposure meter according to the invention.
Figure 2:
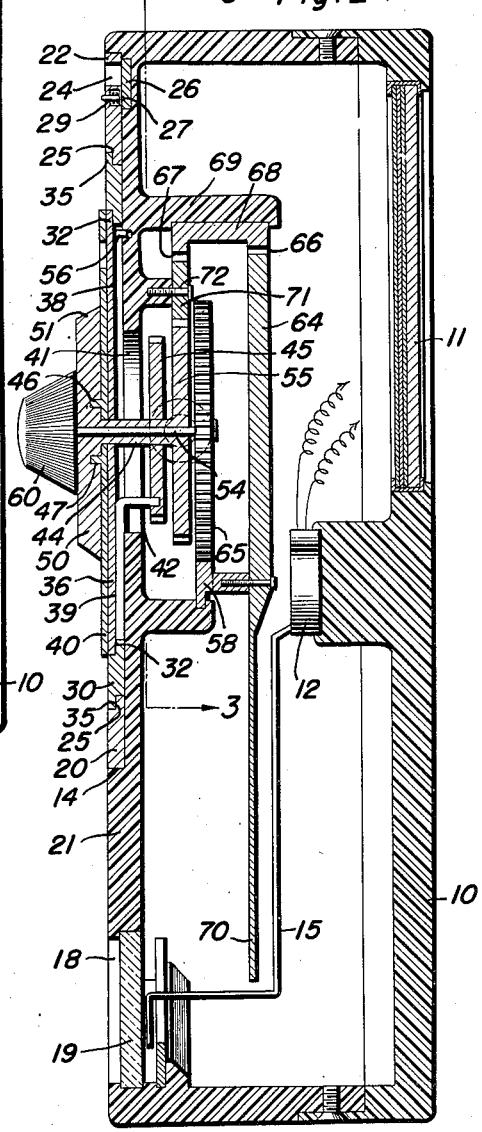
Figure 2 is an elevational sectional view through the exposure meter on an enlarged scale, the section being taken along line 2—2 of Figure 1.
Figure 5:
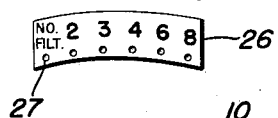
Figures 5 and 6 are a front view and a sectional view respectively of details.

As above explained the invention comprises an improved exposure meter of the type, using a current generating photoelectric cell operating a galvanometer pointer, and a follow up pointer which is adjusted by the operator so that its position coincides with the photocell operated pointer. The adjustment of the follow up pointer brings the dials of the exposure meter into such a relative position that the correct exposure data, such as shutter speed, aperture etc., may be read on them. In addition certain preliminary adjustments, made by the operator in conformity with factors selected in accordance with the type of picture to be produced, such as the speed of the film emulsion of the selected film, the color filter to be used etc., have the effect of bringing the exposure meter readings into accord with these factors.

The improved exposure meter according to the inventor therefore comprises a casing 10, carrying a photo-electric cell 11 of the generating type connected to a galvanometer 12 for measuring the current generated which is provided with a pointer 15, playing on a scale 16 which may or may not indicate the intensity of the illumination received by the cell in any approved unit. The pointer is visible through an opening 18 which may be closed, as usual by a glass plate 19 to keep the interior of the casing completely closed and inaccessible.

If the side turned towards the object is referred to as the front side the rear side of the casing carries the mechanism to be operated and the dials to be read by the operator.

This mechanism consists of a scale plate 20, which may be of annular shape and which is seated on or in a suitable recess 14 in the rear wall 21 of the casing 10. The annular plate 20 is preferably provided with an extension 22 on its upper side in which a window 24 is provided for a purpose to be explained. Its inner edge may be recessed or stepped as shown at 25.

The extension 22 moves within an extension 23 of the recess 14 and means (not shown) are provided for permitting the operator to seize the extension and to rotate the annular plate 20 to the desired extent.

Figure 6:
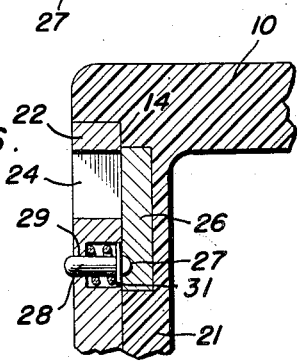
Figure 3:
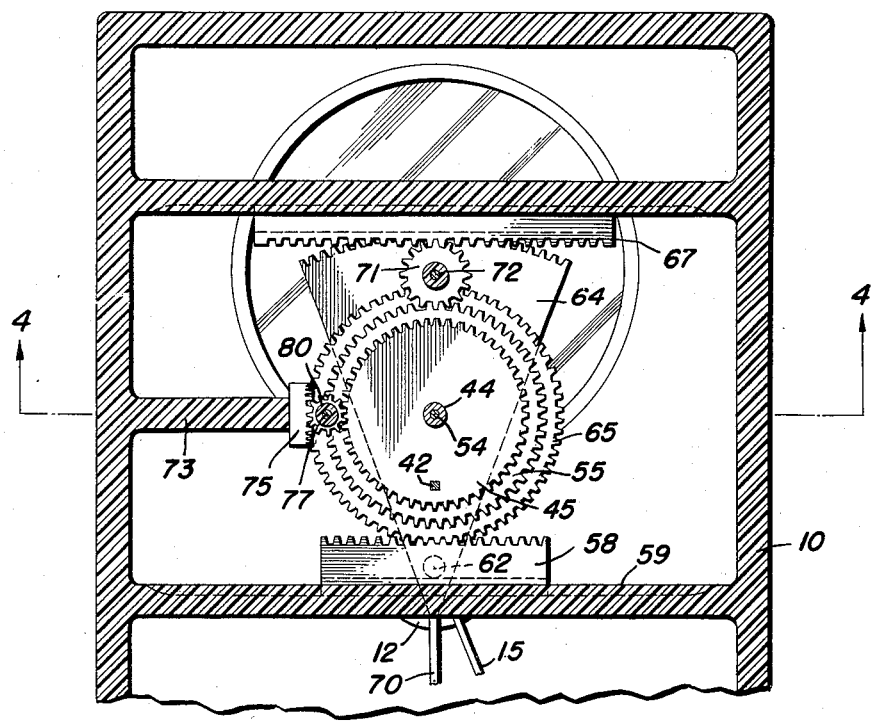
Figure 3 is a fragmentary elevational sectional view through the upper portion of the exposure meter the section being taken along line 3—3 of Figure 2.
Figure 4:
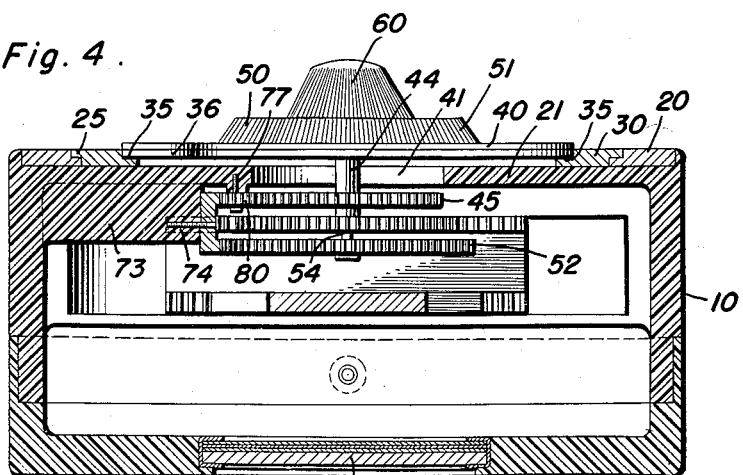
Figure 4 is a sectional plan view, the section being taken along line 4—4 of Figure 3.

Fixed to the casing 10 behind the extension 22 of scale plate 20 is a filter factor plate 26 which contains a number of filter factor indications corresponding to the filter factors associated with the filters in use on the camera of the operator. One of said indications corresponds to the position of the scale plate 20 in the event that no filter is used. The filter factor plate 26 is preferably also provided with a number of holes or depressions 27 (Figure 6) into which a locking pin 28 held in the scale plate 20 may enter. The pin may be guided in a bore 29 and is preferably pressed towards the filter factor plate by a spring 31, located in a recess of the scale plate 20 on the side turned towards the casing 10. It will be clear that the locking pin may be either provided with a nut or head permitting to withdraw it from the holes or that the depressions may be provided with inclined side walls pressing the locking pin rearwardly when the scale plate is shifted. A certain resistance will thus be offered against accidental displacement of the scale plate 20, so that the latter may be considered as locked for all practical purposes when the locking pin enters a hole or depression.

Concentrically with the annular scale plate 20 a second annular scale plate or disk 30 is arranged which may be provided on its outer rim with a ledge 35 covering the stepped or recessed portion 25 of scale plate 20. The faces of the two scale plates 20 and 30 may thus be arranged in the same plane, with the scale plate 30 holding the scale plate 20 on its base. The scale plate or disk 30 preferably carries on its outer edge a scale showing the relative apertures.

The scale plate or disk 30 is moreover recessed or is provided with a stepped portion 32 on its inner side in order to accommodate a further disk or plate 36 described below.

It is provided with a central opening 38 and with an arm 39 reaching towards the center and bent at right angle at 42 so as to reach through a circular opening 41 of the casing 10 surrounding the common center line of the scale plates.

The bent end or tongue 42 of the arm engages a toothed wheel 45 seated but freely rotatable on a hollow axle 44 which is arranged in the center line of the annular scale plates or disks. This axle is connected with a knob 50 in the shape of a disk with a knurled or milled edge portion 51 which is coupled with a further circular plate or disk 40 concentrically arranged with annular scale plates 20, 30 and provided with coupling pins 46 entering corresponding holes 47 in the face of the knob turned towards said plate.

This circular plate or disk 40 is provided with a window 48 permitting to view indications provided on the disk 36 located directly behind plate or disk 40 and held within the central recessed or stepped portion 32 of the scale plate or disk 30. The disk 36 is fixed on the casing by means of a lug or pin 56 entering a corresponding recess or hole in the rear wall of the casing.

Disk 36 carries indications corresponding to the speed of the emulsion of the film used. It will therefore be clear that when knob 50 is turned so that the required indication corresponding to the speed of the emulsion appears in the window 48, the axle 44 will have been turned through an angle proportional to the selected emulsion speed.

The hollow axle 44 which passes through the opening 41 of the rear wall 21 of the casing is held by and surrounds the axle 54 which is connected with a central milled knob 60 on the rear side which is located on top of the knob 50 and which may be seized and turned by the operator. The axle 54 carries a spur wheel 65 which is fixed on it. Likewise the hollow axle 44 carries a spur wheel 55 which rotates with it.

The spur wheel 65 meshes with a rack 58 which is slidably arranged within the casing 10 and which moves along a rib 59 in which a suitable guide for the rack is provided. This rack carries the pivot bolt 62 for the follow up pointer 70. The said pointer is connected with a toothed sector 64 which meshes with one of the racks 66 of a U-shaped slidable double rack 68 which is slidably held and guided in a manner not shown on a rib 69 projecting inwardly from the rear wall 21 of the casing. The second rack 67 of the double rack 68 meshes with a pinion 71 mounted on an axle 72 which is held in a lug or projection of the rear wall 21, and which meshes in its turn with the spur wheel 55 integral with or fixedly held by the axle 44. It will therefore be clear that a displacement of the rack 68 will rotate the pointer 70 around its pivot 62 while a displacement of rack 58 will displace the pivot 62 laterally and, on account of the engagement of the teeth of the sector 64 with the rack 68, the pointer will also be rotated in this case while the sector rolls on the rack.

The spur wheel 65 also meshes with the teeth of a crown wheel 75 which turns on an axle fixedly held in a ledge or rib 73. Said crown wheel also meshes with the pinion 80 turning on an axle 77 fixedly held on the rear wall 21 of the casing which is in engagement with spur wheel 45. The latter wheel, as above described, is rotatably mounted on axle 44 and is coupled with scale plate 30 by means of arm 39 and tongue 42.

The operation of the device will be readily understood from the foregoing description.

It will first be clear that the shutter speed scale and the relative aperture scale facing each other are intended to provide pairs of values, of which each pair is usable under the prevailing circumstances. The operator has merely to select one of the two values, for instance the shutter speed if he intends to make pictures of rapidly moving objects, and the other value viz. the relative aperture is thereby automatically determined and indicated by the point of the aperture scale facing the selected shutter speed.

In order to determine the relative position of the two scales when a filter is to be used and when the emulsion speed is known the operator proceeds by making first a preliminary adjustment valid for all light conditions whereupon he proceeds by exposing his cell to the light prevailing in the locality where the picture is to be taken and after having determined the pointer position for this type of illumination he moves the follow up pointer into coincidence with the galvanometer pointer.

Assuming first that the operator wants to use a filter having the filter factor 2 and an emulsion rating of 50. He then proceeds by turning scale plate 20 until the number "2" corresponding to the selected filter factor appears in the window 24. It will be noted that the "fixed" scale (showing shutter speeds in this case) against which the movable scale (relative apertures) is to be read, is in this case so displaced, that higher values of the relative apertures (when compared with the "no filter" position) will be paired with the shutter speed values, in order to take into account the fact that a filter requiring a lengthening of the exposure time is used.

After this adjustment has been made knob 50 is rotated to set the apparatus for the selected emulsion rating. When knob 50 is turned the pins 46 resting in the grooves 47 displace plate 40 and thereby shift the window 48 along the emulsion speed scale on the fixed plate 36. When the desired point has been reached this is indicated by the appearance of the figure indicating the rating of the emulsion speed in the window.

When knob 50 is turned spur wheel 55 is rotated, rotating pinion 71 and displacing double rack 68. This produces an angular movement of the sector 64 and of the follow up pointer 70. The said pointer is therefore moved to a position which forms the starting position for the following measurement and in which the arc through which the pointer has to be moved in order to produce coincidence with the galvanometer pointer in the following phase is either lengthened or shortened, when compared with a basic or normal emulsion speed rating and in this way the higher or lower rating of the emulsion speed is taken care of.

After this preparatory adjustment has been completed—an adjustment which remains unchanged, as long as the same type of film and the same filter is used—the cell is exposed to the light which is used for making the picture and thereby the galvanometer pointer 15 is brought to the position forming the base of the measurement. The operator now turns knob 60 until pointer 70 is aligned with pointer 15 or with the position pointer 15 occupied while the cell was pointing towards the object the illumination of which is to be measured.

When knob 60 is turned, axle 54 and spur wheel 65 are rotated. Thereby simultaneously rack 58 is displaced and the crown wheel 75 is rotated. The displacing of the rack 58 also displaces pivot 62 of the pointer and as the sector 64 meshes with rack 66 and as the latter is fixedly held, the sector 64 rolls on the rack and the pointer 70 is moved until it reaches the position of alignment with pointer 15. During this movement the crown wheel 75 turns and rotates the scale plate 30 through an arc which corresponds to the angular displacement of the pointer. The latter is of course determined by the deflection of pointer 15 on one hand and by the starting position of pointer 70 on the other hand. The rotation of the scale plate 30 brings the values of the relative aperture into alignment with the coordinated shutter speed values for the illumination indicated by the galvanometer pointer with the correction for emulsion speed and filter factor.

It will be clear that the exposure meter as described has the main advantage that a reading may be obtained very quickly especially once the preadjustment has been made which will be the case with the majority of the exposures. Moreover the dials are not cluttered up with figures, letters and indications, so that the reading is clear and the probability of errors is reduced. Moreover the setting for filter factors is extremely simple and does not entail a complicated additional operation. The manipulation is simple and merely consists in the turning of knobs, the turning of the dial plate for the filter factor being the sole exception.

The apparatus is extremely compact and may therefore be built in or may be housed within a very small casing.

It may finally be remarked that the showing in the drawings is partly diagrammatic insofar as some of the mechanical features, such as journalling of axles, guiding of displaceable parts and the like has only been indicated diagrammatically in order to provide a more comprehensive showing with the least number of figures.

However it will be understood that some of the mechanical means may be replaced by others and modified, and that changes of nonessential nature will not in any way affect the invention.

Having described the invention, what is claimed as new is:

An exposure meter with a current generating photoelectric cell and a galvanometer pointer for measuring the illumination to which said cell is exposed, comprising a casing provided with a window, displaying a portion of the galvanometer pointer, an adjustable annular scale plate, provided with a window and with elastic means of fixation in a plurality of positions, a filter factor scale plate fixedly mounted in the casing provided with filter factor indicating marks, adapted to be displayed through the window of the adjustable scale plate and further provided with means for receiving the fixation means so as to fixedly adjust the scale plate in a selected position corresponding to a filter factor, a concentric rotatable annular scale plate, cooperating with the first named scale plate, and provided with a coupling arm, one of said scale plates carrying shutter speed indications and the other relative aperture indication marks, a third concentric scale plate provided with a window, a fixed scale plate carrying indication marks indicating emulsion speeds, two concentric axles in the center of said concentric scale plates, each axle carrying an adjustment knob, one of said knobs being fixedly coupled with the last named rotatable scale plate, the axle carrying said knob also being fixedly connected with a spur wheel, a U-shaped shiftable member with two parallel spaced racks, one of said racks being operatively connected with said spur wheel, a follow up pointer, a pivot for the same, a toothed segment connected with said pointer meshing with the second rack on the U-shaped member, a second knob attached to the second one of the concentric axles, the said second axle carrying a spur wheel, a further rack meshing with said spur wheel, said rack being shiftable in substantial parallelism to the U-shaped member and carrying the pivot of the follow up pointer, a freely rotatable spur wheel on the said concentric axles coupled with the coupling arm of the first named rotatable scale plate, and a crown wheel mechanism for establishing a gear connection between the spur wheel on the second axle and the said freely rotatable wheel, adapted to transmit the follow up movement of the follow up pointer to the first named rotatable scale plate.

ROBERT S. NORMAN.

REFERENCES CITED

The following references are of record in the file of this patent:

UNITED STATES PATENTS

| Number | Name | Date |
|---|---|---|
| 2,305,294 | Kuppenbender | Dec. 15, 1942 |
| 2,418,370 | Simmon | Apr. 1, 1947 |
| 2,461,930 | Simpson | Feb. 15, 1949 |
| 2,467,946 | Rassman et al. | Apr. 19, 1949 |

FOREIGN PATENTS

| Number | Country | Date |
|---|---|---|
| 458,546 | Great Britain | Dec. 22, 1936 |